United States Patent [19]

Nonaka

[11] Patent Number: 5,361,117
[45] Date of Patent: Nov. 1, 1994

[54] DISTANCE-MEASURING DEVICE WHICH DETECTS WHICH DETECTS AND CORRECTS PROJECTION ERRORS OF DISTANCE-MEASURING LIGHT BEAMS

[75] Inventor: Osamu Nonaka, Sagamihara, Japan

[73] Assignee: Olympus Optical Co., Ltd., Tokyo, Japan

[21] Appl. No.: 97,728

[22] Filed: Jul. 27, 1993

Related U.S. Application Data

[63] Continuation of Ser. No. 988,833, Dec. 10, 1992, abandoned.

[30] Foreign Application Priority Data

Dec. 16, 1991 [JP] Japan ................ 3-332093

[51] Int. Cl.⁵ ................ G03B 13/36; G01C 3/08; G01J 1/20
[52] U.S. Cl. ................ 354/403; 356/1; 356/4; 250/201.4
[58] Field of Search ................ 354/403; 356/1, 4; 250/201.4, 201.6

[56] References Cited

U.S. PATENT DOCUMENTS

| | | | |
|---|---|---|---|
| 4,464,038 | 8/1984 | Nanba | 354/403 |
| 4,477,168 | 10/1984 | Hosoe | 354/403 |
| 4,533,241 | 8/1985 | Masunaga et al. | 354/403 X |
| 4,575,211 | 3/1986 | Matsumura et al. | 354/403 |
| 4,740,806 | 4/1988 | Takehara | 354/403 |
| 4,804,491 | 2/1989 | Ishizuki et al. | 354/403 |
| 4,855,585 | 8/1989 | Nonaka | 354/403 X |
| 5,051,766 | 9/1991 | Nonaka et al. | 354/403 X |
| 5,060,004 | 10/1991 | Ikuta | 354/403 |
| 5,136,148 | 8/1992 | Nonaka et al. | 354/403 X |
| 5,157,435 | 10/1992 | Gi-Min et al. | 354/403 |
| 5,184,168 | 2/1993 | Nonaka | 354/403 |
| 5,204,714 | 4/1993 | Nonaka | 354/403 |
| 5,210,585 | 5/1993 | Suzuki | 354/403 X |
| 5,235,377 | 8/1993 | Ide et al. | 354/403 |
| 5,264,892 | 11/1993 | Nonaka et al. | 354/403 |

FOREIGN PATENT DOCUMENTS

| | | |
|---|---|---|
| 1-222235 | 9/1989 | Japan. |
| 2-212808 | 8/1990 | Japan. |

Primary Examiner—W. B. Perkey
Attorney, Agent, or Firm—Frishauf, Holtz, Goodman & Woodward

[57] ABSTRACT

A distance-measuring device of this invention is characterized in that the distance measured by the PSDs is corrected on the basis of the direction and the amount of a spot light deviation obtained by a combination of three light-receiving elements that receives an asymmetrical spot, in order to prevent erroneous distance measuring due to spot light deviations in an infrared projection trigonometrical measurement system. With the present invention, the IRED projects a spot with protruding portions symmetrical and perpendicular to the base length, onto the subject. Then, the SPD of a first light-receiving section of a light-receiving element located the base length away from the IRED receives the protruding portions of the spot, and the SPD of a second light-receiving section receives the protruding portions. This allows the incident position of the reflected light from the object to be sensed. Based on the output of the SPDs of the light-receiving element, the AFIC computes the distance to the object.

51 Claims, 10 Drawing Sheets

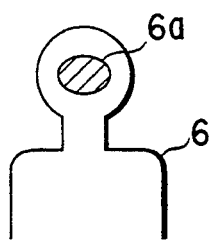
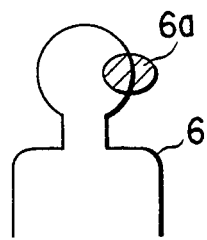
FIG. 3A (PRIOR ART)    FIG. 3C (PRIOR ART)
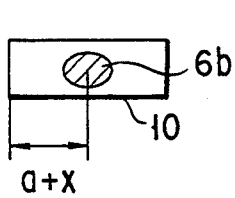
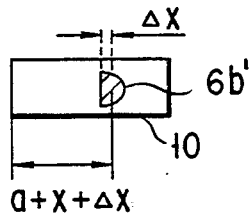
FIG. 3B (PRIOR ART)    FIG. 3D (PRIOR ART)
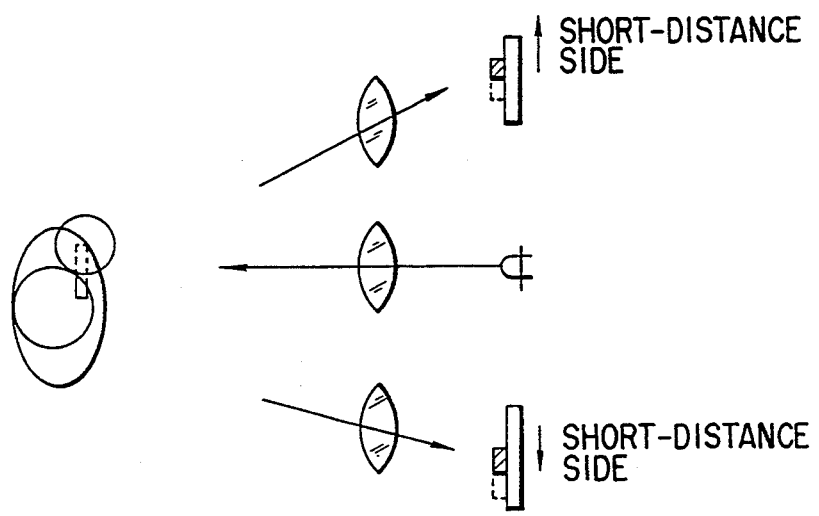
FIG. 4 (PRIOR ART)

$V_b = V_c$ $V_b < V_c$ $V_b > V_c$

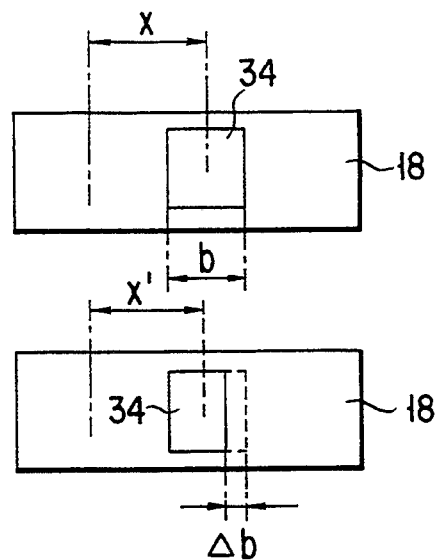
FIG. 7A
FIG. 7B
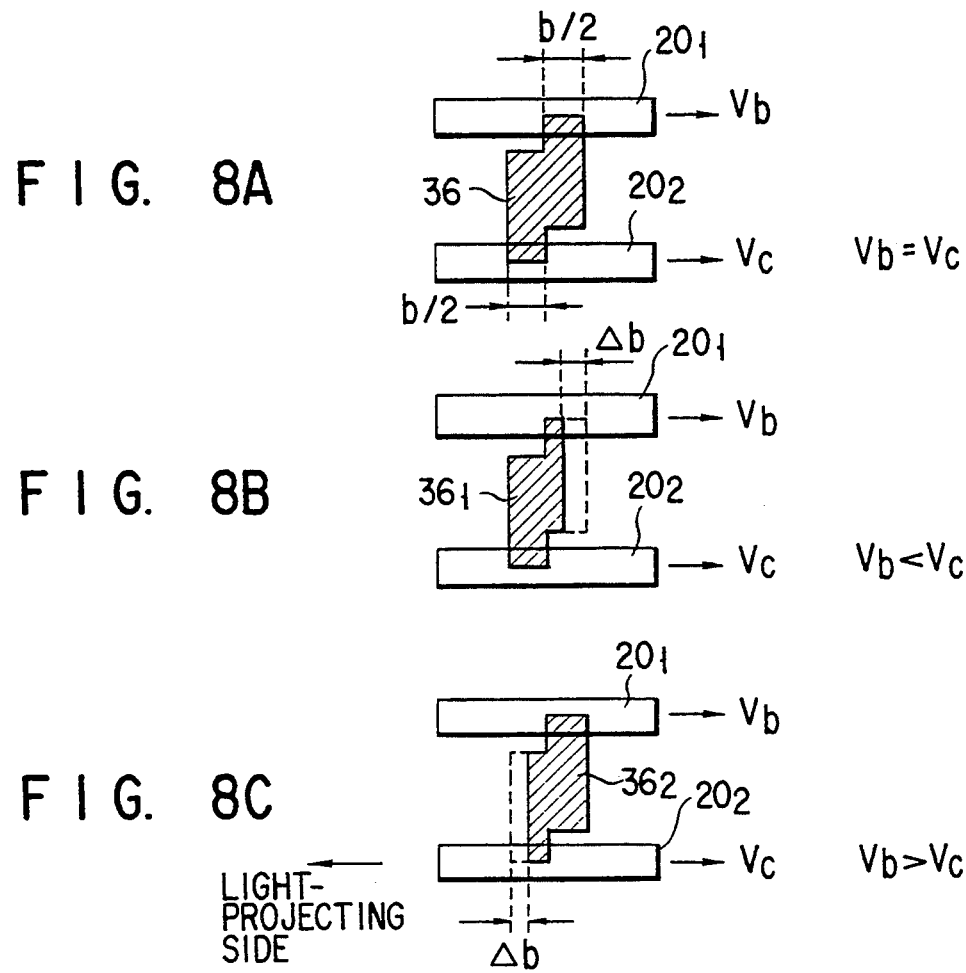
FIG. 8A
FIG. 8B
FIG. 8C

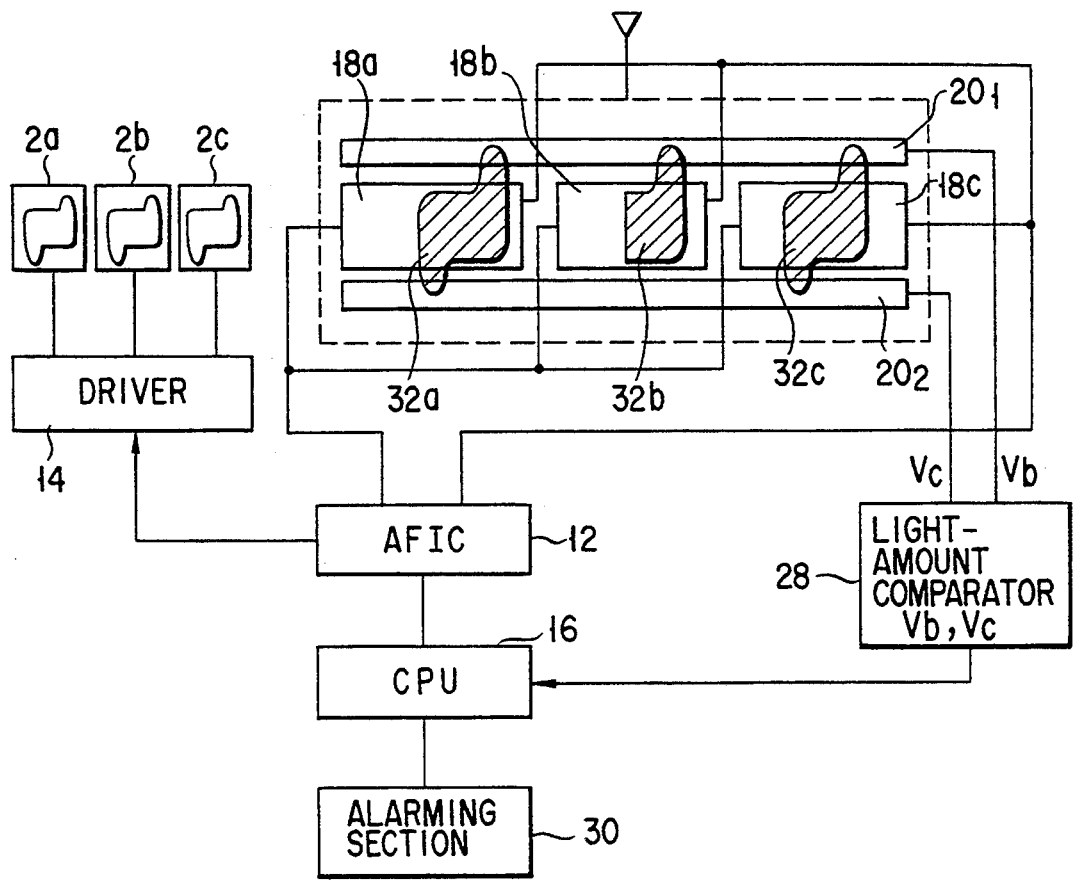
F I G. 13A

DISTANCE-MEASURING DEVICE WHICH DETECTS WHICH DETECTS AND CORRECTS PROJECTION ERRORS OF DISTANCE-MEASURING LIGHT BEAMS

This application is a continuation of application Ser. No. 07/988,833, filed Dec. 10, 1992, now abandoned.

BACKGROUND OF THE INVENTION

1. Field of the Invention

This invention relates to a distance-measuring device, and more particularly to a distance-measuring device for use in the automatic focusing (AF) device of an active camera or video.

2. Description of the Related Art

There are two types of camera automatic focusing techniques: a passive system that makes use of luminance distribution information on the subject and an active system that projects a signal of infrared rays or the like onto the subject, and based on its reflected signal, determines the distance to the subject. Of them, the active system is more widely used for low-priced compact cameras because of its simple configuration.

FIG. 1 shows the construction of an infrared projection trigonometrical measurement system that projects infrared rays, senses the incident position of the reflected signal light, and determines the subject distance. In the figure, numeral 2 indicates an infrared light-emitting diode (IRED) acting as a light-projecting element, whose rays of light are gathered via a projection lens 4 onto the subject 6. The reflected signal light from the subject 6 is accepted by a reception lens 8, which directs it to a light-position sensing element (PSD) 10. The PSD 10 is an element that, if the position at which the light has arrived is x, produces two current signals $I_1$ and $I_2$ at each end according to the incident position.

Here, if the distance between the optical axis of the reflection lens 8 above the PSD 10 and one edge of the PSD 10 is a, equation (1) will hold:

$$I_1 = \frac{a+x}{t} I_p \quad (1)$$

where t is the length of the PSD 10, and $I_p$ is the total signal optical current that is expressed as:

$$I_p = I_1 + I_2 \quad (2)$$

If the distance between the optical axis of the projection lens and that of the reception lens is the base length S, and the distance between the reception lens 8 and the PSD 10 is f, the subject distance Z is expressed by equation (3):

$$l = \frac{S \cdot f}{x} \quad (3)$$

Thus, from equations (1) and (2), the following equations will hold:

$$\frac{I_1}{I_1 + I_2} = \frac{a+x}{x} \quad (4)$$

$$x = t\left(\frac{I_1}{I_1 + I_2}\right) - a \quad (5)$$

In this way, the subject distance l is obtained.

The AFIC 12 calculates the output signal currents $I_1$ and $I_2$ of the PSD 10 in the form of equation (4) at the same time that it actuates the driver 14 to causes the IRED 2 to emit light.

From equations (5) and (3), the following equation is obtained:

$$\frac{I_1}{I_1 + I_2} = (x+a)/t = \frac{1}{t}\left(\frac{S \cdot f}{l} + a\right) \quad (6)$$

AFDATA is defined as expression (7):

$$AFDATA \stackrel{\Delta}{=} \frac{1}{t}\left(\frac{S \cdot f}{l}\right) \propto \frac{I_1}{I_1 + I_2} \quad (7)$$

From expression (7), the relationship between the reciprocal 1/l of the distance shown in FIG. 2 and AFDATA is determined.

Further, the CPU 16 computes 1/l based on equation (6), and controls the focusing lens. Specifically, 1/l is calculated from the following equation:

$$1/l = \left\{t\left(\frac{I_1}{I_1 + I_2}\right) - a\right\} \cdot \frac{1}{S \cdot f} \quad (8)$$

In the aforesaid infrared projection trigonometrical measurement system, what is called a spot light deviation takes place. Specifically, when all of the projected signal light (the spot light 6a) is on the subject 6 as shown in FIG. 3A, the reflected signal light 3b correctly hits the PSD 10 as shown by the shaded portion in FIG. 3B. When the projected signal light (the spot light 6a) is not completely on the subject and only half of the reflected signal light 6b' comes back, however, the position of the light point on the PSD 10 is shifted by Δx.

Since this system uses equation (3) as a basic equation, the deviation of Δx is converted to the distance Δl expressed by equation (9), leading to erroneous distance measuring:

$$\Delta l = S \cdot f\left(\frac{1}{x + \Delta x} - \frac{1}{x}\right) \quad (9)$$

To remove this problem, for example, in Published Unexamined Japanese Patent Application No. 1-222235, two reception lenses 8a and 8b are placed symmetrically with the projection lens 4 as shown in FIG. 4. Specifically, with the system of the Published Unexamined Japanese Patent Application No. 1-222235, the deviation Ax on one PSD 10a has the opposite effect to that of Ax on the other PSD 10b. Therefore, taking an arithmetic means of the outputs of two PSDs 10a and 10b prevents erroneous distance measuring, thereby enabling the distance to be measured correctly.

This system, however, requires two reception lenses, resulting in a larger camera layout. Because the distance from one PSD to the AFIC becomes larger, the line is liable to be affected by noises. For this reason, the system is disadvantageous in terms of signal-to-noise (S/N) ratio.

SUMMARY OF THE INVENTION

Accordingly, the object of the present invention is to provide a distance-measuring device with a simplified configuration that minimizes the effect of spot light deviation and assures a higher performance without making the camera layout larger or degrading the S/N ratio.

The foregoing object is accomplished by providing a distance-measuring device comprising: light-projecting means for projecting light onto the subject, the projection pattern of the light-projecting means having the central area along the base length, and two protruding areas perpendicular and asymmetrical to the base length; light-receiving means for receiving the reflected portion of the projected light from the subject, which contains a first light-receiving section that receives the reflected light associated with the light projected from the central area and produces a first photoelectric conversion signal, a second light-receiving section that receives the reflected light associated with the light projected from one of the two protruding areas and produces a second photoelectric conversion signal, and a third light-receiving section that receives the reflected light associated with the light projected from the other of the two protruding areas and produces a third photoelectric conversion signal; computing means for calculating the distance to the subject based on the first photoelectric conversion signal; and comparator means for comparing the second and third photoelectric conversion signals and supplying the comparison result, from which it is judged that the light-projecting means has thrown light uniformly onto the subject when those two signals are almost equal, while part of the projected light is missing when one of them is larger than the other.

The foregoing object is also accomplished by providing a distance-measuring device of a camera comprising: light-projecting means for projecting light onto the subject, which contains a first light-projecting section that projects a first projection pattern asymmetrical with the base length along the optical axis of the taking lens, and a second light-projecting section that projects a second projection pattern of a symmetrical shape in opposite directions flanking the optical axis of the taking lens; a plurality of light-receiving means for receiving the reflected portion of the projected light from the subject, which contains a first light-receiving section that receives the reflected light associated with the portions other than the asymmetrical portions of the first projection pattern and produces a first photoelectric conversion signal, and a second light-receiving section that receives the reflected light associated with both the asymmetrical portions of the first projection pattern and the second projection pattern and produces a second photoelectric conversion signal; computing means for calculating the distance to the subject based on the first photoelectric conversion signal during the projection of the first projection pattern and the second photoelectric conversion signal during the projection of the second projection pattern; and judging means for determining whether or not all of the first projection pattern from the light-projecting means is projected onto the subject on the basis of the second photoelectric conversion signal during the projection of the first projection pattern.

The foregoing object is still accomplished by providing a distance-measuring device measuring the distance to the object comprising: light-projecting means for projecting light onto the object, the projection pattern of the light-projecting means having an asymmetrical portion with respect to the base length; light-receiving means for receiving the reflected light from the object of the asymmetrical portion of the projected light, and produces a first photoelectric conversion signal; and judging means for determining whether or not all of the projection pattern from the light-projecting means is on the object on the basis of the first photoelectric conversion signal.

The foregoing object is achieved by providing an active distance-measuring device comprising light-projecting means for projecting a light beam onto the object, light-receiving means located a predetermined base length away from the light-projecting means for receiving the reflected light from the object of the light beam, and computing means for obtaining the value corresponding to the distance to the object based on the output of the light-receiving means, the active distance-measuring device characterized in that: (a) the projection pattern of the light-projecting means has two protruding areas that extend at both ends of the base length in opposite directions at right angles with the base length; (b) the light-receiving means is composed of a main light-receiving element that receives the reflected light associated with the areas other than the protruding areas of the projection pattern and produces an optical current according to the light-receiving position, and two sub-light-receiving elements that receive the reflected light associated with the two protruding areas of the projection pattern and produces an optical current corresponding to the amount of light received; and (c) the computing means obtains a value corresponding to the distance to the object based on the output of the main light-receiving element and judges from the output of the two sub-light-receiving elements whether or not a spot light deviation has occurred, and, when the judgment shows the presence of a spot light deviation, corrects the value corresponding to the distance to the object.

The foregoing object is still achieved by providing an active distance-measuring device comprising: light-projecting means for projecting distance-measuring light onto the subject, the projection pattern of the light-projecting means being asymmetrical with the base length; light-receiving means located a predetermined distance away along the base length for receiving the reflected light from the subject of the distance-measuring light, which is composed of a main light-receiving element that produces an optical current corresponding to the position in which the light has been received, and two sub-light-receiving elements located on both sides of the main light-receiving element for producing optical currents corresponding to the amount of light received; and computing means for producing a signal corresponding to the distance to the subject based on the outputs of the main light-receiving element and two sub-light-receiving elements.

The foregoing object is still further achieved by providing a distance-measuring device projecting distance-measuring light onto a plurality of points on the image screen to measure the distance to each point, comprising: judging means for judging whether or not all of the projection pattern of the distance-measuring light projected at least onto the central portion of the screen is on the subject, wherein the distance-measuring device discards the distance measurement result of the light-projecting pattern when the judgment result shows that all of the projection pattern is not on the subject.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 3A through 3D are diagrams showing states in which spot light deviation takes place when a conventional light-receiving element is used;

FIG. 4 shows an example of a conventional distance-measuring device with provision against spot light deviation;

FIGS. 7A and 7B are diagrams for explaining spot light deviation when the FIG. 5 light-receiving element is simplified into a single PSD;

FIGS. 8A through 8C are diagrams for explaining a method of sensing the amount of spot light deviation of the light-receiving element used in the distance-measuring device of the present invention;

FIGS. 13A and 13B are conceptual diagrams of the light projecting and receiving circuit portions of a distance-measuring device according a third embodiment of the present invention;

DETAILED DESCRIPTION OF THE PREFERRED EMBODIMENTS

Referring to the accompanying drawings, embodiments of the present invention will be explained hereinafter.

Figure 5:
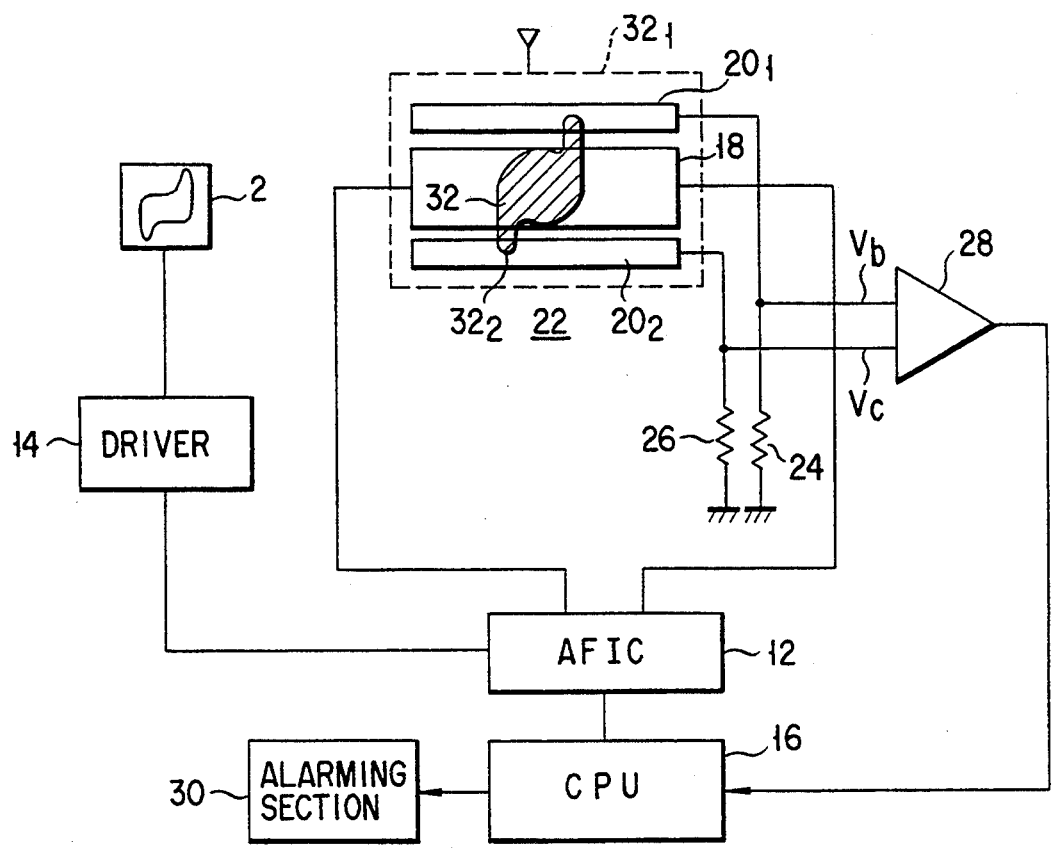
FIG. 5 is a conceptual diagram of the light projecting and receiving circuit portions of a distance-measuring device according a first embodiment of the present invention.

FIG. 5 is a conceptual diagram of the light projecting and receiving circuit portions of a distance-measuring device according a first embodiment of the present invention. In the figure, a light-receiving element 22 is divided along the base length into three portions. In the middle portion is placed a PSD 18 with a position sensing function, and on both sides (above and below the middle portion in the figure) are located silicon photodiodes (SPDs) $20_1$ and $20_2$ that sense the intensity of incident light. These SPDs $20_1$ and $20_2$ are connected to resistances 24 and 26 that convert their current outputs into voltage form, as well as to a comparator 28 acting as a comparing means for comparing the outputs $V_b$ and $V_c$ of the SPDs $20_1$ and $20_2$.

The output of the PSD 18 is supplied to an AFIC 12. The AFIC 12 actuates a driver 14 to cause an IRED 2 serving as a light-projecting element to emit light. A CPU 16 computes the distance based on each output from the AFIC 6 and comparator 14, and determines the reliability of the computations made. A alarming section 30, at the direction of the CPU 16, alerts the operator to spot light deviation by means of, for example, audible or visual alarm, when spot light deviation takes place, which will be explained later.

It is assumed that the distance-measuring light spot emitted by the IRED 2 is a spot 32 shaped as shown on the light-receiving element 22. Specifically, unlike the conventional round spot shown in FIGS. 3A and 3C, the spot 32 has a pattern with protrusions $32_1$ and $32_2$ on both sides, one projecting upward and the other downward. The protrusions $32_1$ and $32_2$ of the spot 32 are designed to allow the reflected distance-measuring light to strike, at the same amount of light, the SPD $20_1$ and SPD $20_2$ serving as light amount sensors, when the reflected light has come back to the light-receiving element 22 without any spot deviation.

Figure 6A:
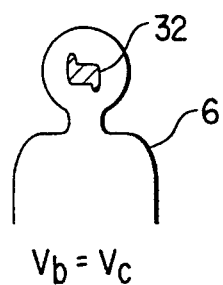
FIGS. 6A through 6C are diagrams for explaining spot light deviation when the FIG. 5 light-receiving element is used.
Figure 6B:
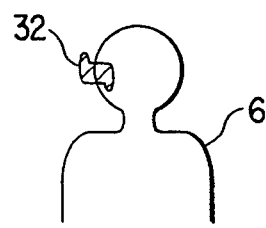
Figure 6C:
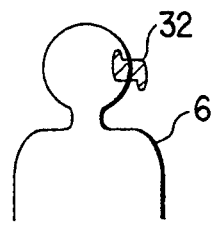

Therefore, in a state where there is no spot light deviation as shown in FIG. 6A, the voltage signals $V_b$ and $V_c$ supplied to the comparator 28 become equal. In a state where spot light deviations occur as shown in FIGS. 6B and 6C, however, the light signals from the upward and downward projections $32_1$ and $32_2$ do not come back to the light-receiving element 22, respectively. This makes $V_b$ unequal to $V_c$; in FIG. 6B, $V_b < V_c$ holds, and in FIG. 6B, $V_b > V_c$ holds. The comparison judgment of those voltage signals $v_b$ and $v_c$ is made at the comparator 28. The comparator 28 is assumed, therefore, to have a function that judges three states: $V_b = V_c$, $V_b < V_c$, and $V_b > V_c$.

Receiving the output of the comparator 28, the CPU 16 judges whether or not the result obtained by the AFIC 12 from equation (4), $I_1/(I_1+I_2)$, is reliable for distance measuring.

Specifically, the CPU 16, when the comparator 28 produces the result of $V_b = V_c$, calculates 1/l according to equation (8). Further, when the output of $v_b < v_c$ is supplied as shown in FIG. 6B, the FIG. 5 light projecting and receiving arrangement would provide a distance longer than the actual value of 1/l were computed from equation (8) without any correction. For this reason, correction is made on the shorter distance side. Conversely, in the case of $V_b > V_c$ as shown in FIG. 6C, because a distance shorter than the actual value is obtained as a result of computing equation (8), correction should be made on the longer distance side.

Although a constant amount of correction, such as one-fourth the spot size b, has a good effect, improving the resolution of the comparator 28 allows more accurate calculation of the amount of spot light deviation. Thus, causing the CPU 16 to perform correction based on the more accurate amount provides a much greater effect.

Here, explanation will be given as to how the CPU 16 carries out correction calculation when the amount of spot light deviation $\Delta b$ is sensed. The light-receiving element is assumed to be a single PSD 18 for simplification as shown in FIGS. 7A and 7B. FIG. 7A illustrates a state where no spot light deviation takes place, and FIG. 7B shows a state where a spot light deviation of $\Delta b$ occurs.

By computing l from the position x of the center of gravity of the spot 34 in FIG. 7A state, using equation (3), $l=(S \cdot f)/x$, the proper focusing distance can be obtained. In a state as shown in FIG. 7B, however, when l is obtained from the center x' of gravity of the spot 34' subjected to a spot light deviation, using equation (10), an erroneous distance measurement will result:

$$l_1 = \frac{S \cdot f}{x'} \quad (10)$$

In this case, if lb is known, the following equation holds:

$$x' = x - \frac{\Delta b}{2} \quad (11)$$

Thus, from equation (12), the correct distance can be computed:

$$l = \frac{S \cdot f}{\left(x' + \frac{\Delta b}{2}\right)} \quad (12)$$

By rearranging in terms of the reciprocal of the distance, the following equation is given:

$$\frac{1}{l} = \frac{x'}{S \cdot f} + \frac{\frac{\Delta b}{2}}{S \cdot f} = \frac{1}{l'} + \frac{\frac{\Delta b}{2}}{S \cdot f} \quad (13)$$

Thus, after the CPU 16 has calculated $1/l$ using equation (8), adding $\Delta b/(2 \cdot S \cdot f)$ to the result enables the correct focusing.

For the amount of correction as much as one-fourth the spot size b, equation (14) may be computed, depending on a sign of inequality.

$$\frac{1}{l} = \frac{1}{l'} \pm \frac{b}{4} \quad (14)$$

Referring to FIGS. 8A through 8C, a method of sensing the amount $\Delta b$ of spot light deviation mentioned earlier will be explained. To simplify explanation, it is assumed that the protrusions of the IRED's spot 36 have each a width of b/2.

As shown in FIG. 8A, when there is no spot light deviation, the amount of light hitting the light-receiving sections (SPDs) $20_1$ and $20_2$ is the same, giving $v_b = v_c$.

As shown in FIG. 8B, for the spot $36_1$ with a spot light deviation of $\Delta b$ $V_b < V_c$ holds, and $\Delta b$ can be obtained from equation (15):

$$\Delta b = \frac{V_b}{V_c} \frac{b}{2} \quad (15)$$

As shown in FIG. 8C, for the spot $36_2$ with the opposite spot light deviation to that of FIG. 8B, lb can be obtained from equation (16):

$$\Delta b = \frac{V_c}{V_b} \frac{b}{2} \quad (16)$$

That is, the larger of $V_b$ and $V_c$ must be used as the denominator.

In equations (15) and (16), + and − signs are added, predicting the direction in which a spot light deviation occurs, so as to make use of equation (13) without any correction. Here, it is assumed, therefore, that the light-projecting side is located in the direction shown by the arrow in the figure.

Next, a second embodiment of the present invention will be explained.

Figure 9A:
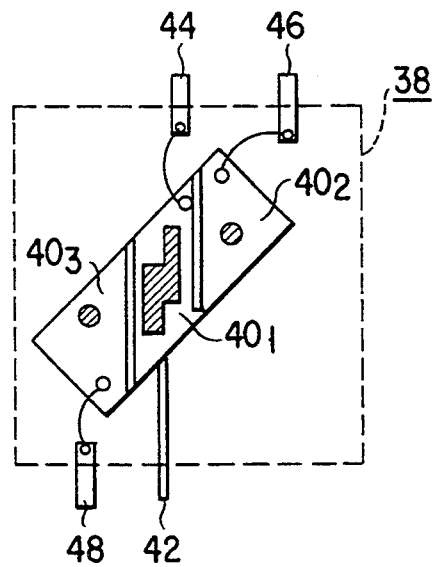
FIGS. 9A and 9B are diagrams showing the construction of a light-projecting and a light-receiving element according to a second embodiment of the present invention.
Figure 9B:
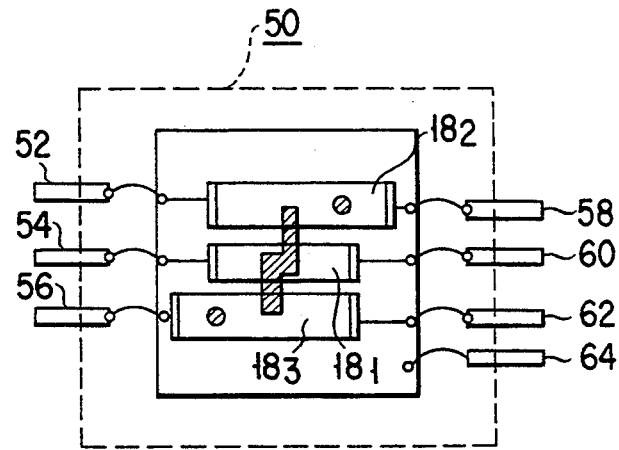

FIGS. 9A and 9B are diagrams showing the construction of light-projecting and light-receiving elements according to a second embodiment of the present invention. Unlike the first embodiment where the light-receiving element is composed of a PSD and two SPDs, in this embodiment, the light-receiving element is made up only of PSDs with a position sensing function, each of which is capable of measuring distance. Therefore, by providing three light-emitting points on the IRED side, the distance between three places on the focusing screen can be measured.

Here, it is assumed that a spot light deviation can be dealt with only at the central distance-measuring point, with the right and left distance-measuring beams being circular. Giving the right and left beams the same shape as that in the center portion enables functional expansion according to the same reasoning.

Figure 10A:
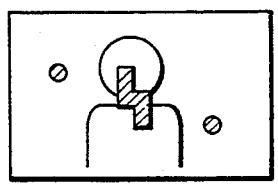
FIGS. 10A and 10B illustrate general composition of photographs where the subject or subjects are on the screen of the light projecting and receiving elements of FIGS. 9A and 9B.

FIG. 10A shows general composition of a photograph where the subject is in the center of the screen. In this case, by measuring three points in the screen as mentioned above, the camera can be properly focused on two persons standing side by side even when there is no subject in the center of the screen.

In FIG. 9A, numeral 38 indicates an IRED containing three light-emitting sections $40_1$, $40_2$, and $40_3$. The light-emitting shape is determined by the arrangement of the current-blocking portion and the surface pattern of the metal electrode. In the figure, the shaded portions are the light-emitting portions. The central portion for distance measuring takes the form as shown in FIG. 8A, which provides measurements against spot light deviation.

Those three light-emitting sections $40_1$, $40_2$, and $40_3$ share a pin 42 as the common anode. This arrangement allows current to flow in from each of pins 44, 46, and 48, thereby enabling each section to emit light independently.

FIG. 9B illustrates the construction of the light-receiving element made up of the aforesaid three PSDs. The light-receiving element 50 has a three-piece construction of separate PSDs $18_1$, $18_2$, and $18_3$, to which pins 52 to 64 are connected.

Numeral 64 indicates the common cathode pin. The intensity of incident light and the signal current dependent on the position are supplied from the pins 54 and 60 of the PSD $18_1$, the pins 52 and 58 of the PSD $18_2$, and the pins 56 and 62 of the PSD $18_3$. The PSDs $18_2$ and $18_3$ can be used as incident-light amount sensors by adding the outputs of both channels, like the SPD shown in FIGS. 8A through 8C. Thus, as shown by the shaded portions in the figure, the reflected light spots are thrown on the PSDs $18_1$, $18_2$, and $18_3$, respectively.

Figure 1:
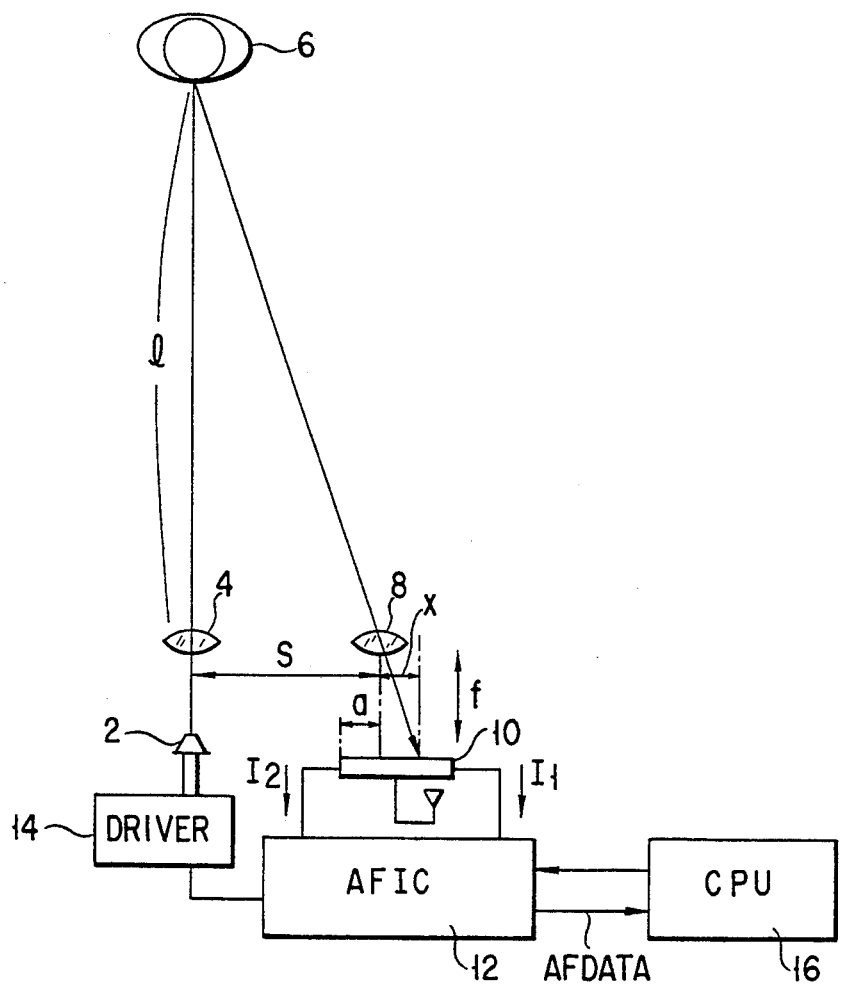
FIG. 1 is a diagram showing the construction of a conventional infrared projection trigonometrical measurement system.
Figure 2:
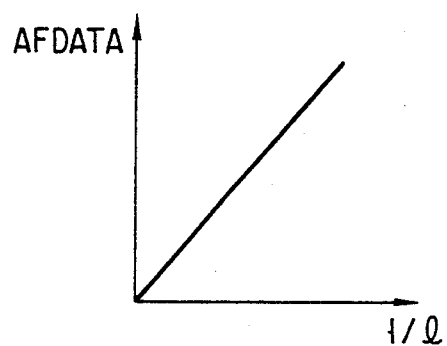
FIG. 2 is a characteristic diagram showing the relationship between the reciprocal 1/l of the distance and AFDATA when a conventional light-receiving element is used.

The central spot is used as the distance-measuring PSD $18_1$, while the PSDs $18_2$ and $18_3$ acting as light-amount monitors detect a spot light deviation, which raises the focusing rate of the subject in the center of the screen. For distance measurement on the right and left sides, by causing the light-emitting sections $40_2$ and $40_3$ of the IRED 38 of FIG. 9A to emit light, and then receiving the reflected light with the PSDs $18_2$ and $18_3$ of the light-receiving element 50 of FIG. 9B, 1/l is calculated from both outputs of the PSDs using equation (8).

The three-piece IRED 38 and the three-piece light-receiving element of PSDs $18_1$, $18_2$, and $18_3$ are each constructed in monolithic form to increase the positional accuracy, and squeezed into separate packages, respectively.

Figure 11:
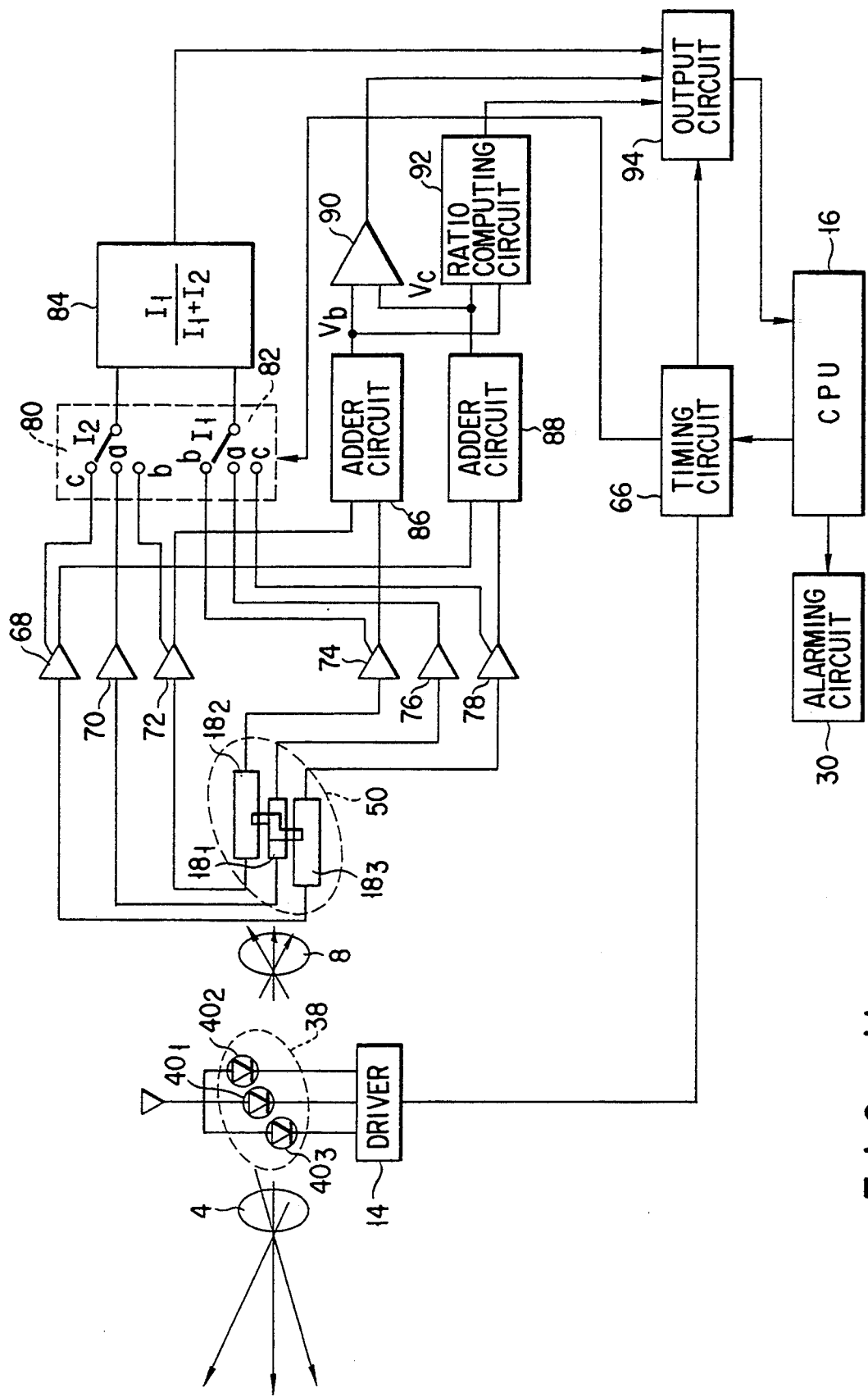
FIG. 11 is a block diagram showing the construction of a distance-measuring device using the light projecting and receiving elements of FIGS. 9A and 9B.

FIG. 11 is a block diagram of the present embodiment. The IRED 38 and light-receiving element 50 are the same as those in FIGS. 9A and 9B.

In FIG. 11, a projection lens 4 and a reception lens 8 are placed as shown in the figure, so that rays of light travel in the direction of the arrow. The light-emitting sections $40_1$, $40_2$, and $40_3$ of the IRED 38 are sequentially energized by a timing circuit 66 under the control of the CPU 16.

The signal projected from each of the light-emitting sections $40_1$, $40_2$, and $40_3$ of the IRED 38 is reflected by the subject and arrives at the light-receiving element 50. The current outputs of the PSDs $18_1$, $18_2$, and $18_3$ of the light-receiving element are drawn at a low impedance into the preamplifiers 68 to 78 connected to both channels of each of the PSDs $18_1$, $18_2$, and $18_3$, which amplify them. The preamplifiers 68, 72, 74, and 78 each have two outputs. It is assumed that both outputs carry the same current obtained by amplifying the PSD output.

The outputs of the preamplifiers 68 to 78 are selected by switches 80 and 82 and supplied as the determined preamplifier outputs $I_1$ and $I_2$ to an arithmetic circuit 84. The arithmetic circuit 84, which is composed of a known logarithmic compression and differential expansion circuits, calculates equation (4), $I_1/(I_1+I_2)$, using the selected preamplifier outputs $I_1$ and $I_2$.

The switches 80 and 82, when the light-emitting section $40_1$ of the IRED 38 emits light, form a closed circuit with contact a to take the signal from the corresponding PSD $18_1$. Similarly, when the light-emitting section $40_2$ of the IRED 38 emits light, they form a closed circuit with contact b corresponding to PSD $18_2$. When the light-emitting section $40_3$ of the IRED 38 emits light, they form a closed circuit with contact c corresponding to PSD $18_3$. Such actions of the switches 80 and 82 are controlled by the timing circuit 66.

Since the PSD $18_2$ and $18_3$ of the light-receiving element 50 are used as light-amount sensors as noted earlier, adder circuits 86 and 88 that add the outputs of both channels of the PSDs are in operation when the light-emitting section $40_1$ of the IRED 38 has emitted light. The output results $V_b$ and $V_c$ of the adder circuits 86 and 88 are used for the sensing of a spot light deviation, as explained in FIGS. 8A through 8C. Specifically, the adder circuit 86 obtains the total signal optical current supplied from the PSD $18_2$, and the adder circuit 88 obtains the total signal optical current supplied from the PSD $18_3$. Both adder circuits then convert the resulting currents into voltages $V_b$ and $V_c$, respectively.

The outputs of the adder circuits 86 and 88 are supplied to a comparator circuit 90 and a ratio computing circuit 92. The ratio computing circuit 92, which is made up of a known analog circuit that performs logarithmic compression and then subtraction, calculates the ratio of $V_b$ to $V_c$ or $V_b/V_c$.

The timing circuit 66, before the IRED 38 emits light, controls the switches 80 and 82 to determine which PSD signal of the light-receiving element 50 is computed. At the same time, it sends a timing signal to an output circuit 94 so that the CPU can sequentially take each of the arithmetic circuit 84, comparator circuit 90, and ratio computing circuit 92.

The output circuit 94 has a function that sampleholds the computation result of the output obtained at the time of the light emission by the IRED 38. As noted earlier, the results held are supplied in sequence to the CPU 16 in response to the signal from the timing circuit 66.

In this way, the CPU 16 computes and evaluates those results, and then determines the final focusing distance. Further, it causes a warning section 30 to alert the photographer to the occurrence of a spot light deviation. Additionally, it, together with the timing circuit 66, controls the sequence of the entire system. Based on the output result of the comparator circuit 90, the CPU 16 also obtains the result of the ratio comparator circuit 92, using equations (15) and (16), and a spot light deviation of $\Delta b$ from the known constant b/2. Then, by making a correction in the output result of the arithmetic circuit 84, $I_1/(I_1+I_2)$, the reciprocal of the correct distance l is obtained from equation (13).

Figure 12:
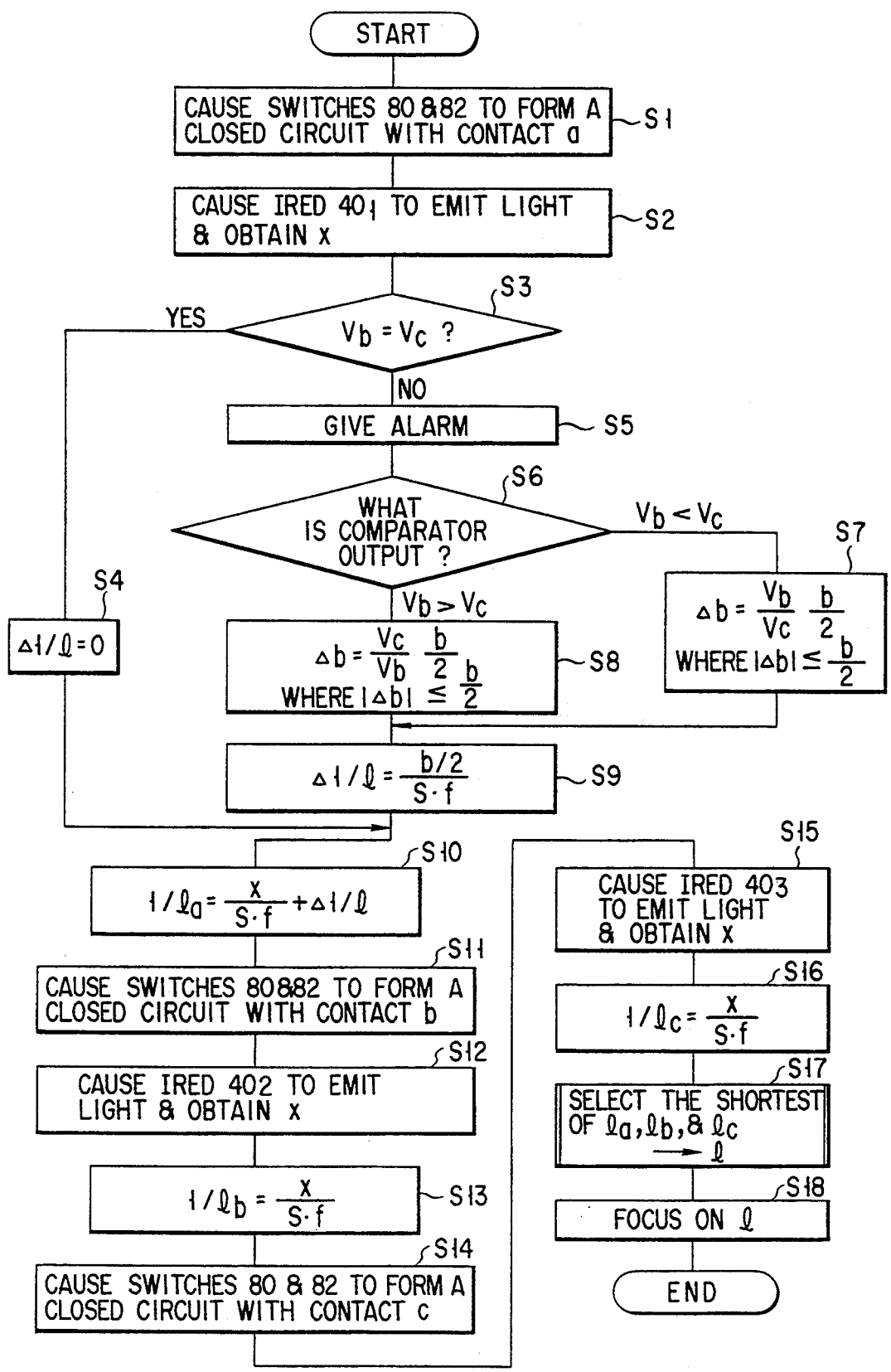
FIG. 12 is a flowchart for explaining the operation of the FIG. 11 distance-measuring device.

The operation of the distance-measuring device thus constructed will be explained, referring to the FIG. 12 flowchart.

In order to measure the distance by the central light-emitting section $40_1$ of the IRED 38, at step S1, the switches 80 and 82 are caused to form a closed circuit with contact a to direct the output of the PSD $18_1$ to the arithmetic circuit 84. At step S2, the IRED $38_1$ is caused to emit light, and the CPU 16 computes the position x of the center of gravity of the signal light on the basis of equation (5).

At step S3, the CPU 16 receives from the comparator circuit 90 the comparison result in magnitude of the voltages $V_b$ and $V_c$ dependent on the light signals that have hit the PSDs $18_2$ and $18_3$. Based on the result, the CPU 16 judges whether or not there is a spot light deviation.

As noted earlier, when there is no spot light deviation, $V_b=V_c$ holds. This allows control to proceed to step S4, where the amount of correction becomes zero. Then, control goes to step S10. When at step S3, $V_b \neq V_c$ does not hold, it is judged that a spot light deviation has taken place, and control proceeds to step S5. When a spot light deviation has occurred, at step S5, the alarming section 30 audibly or visually alerts the photographer to this event and tells him that he should modify the composition to remove the spot light deviation.

For the spot light deviation, the calculation of $\Delta b$ differs with the direction of deviation, as explained in equations (15) and (16). Therefore, at step S6, when $V_b < V_c$, control goes to step S7, and when $V_b > v_c$, control moves to step S8, where the respective operations are executed. At steps S7 and S8, when the numerator becomes zero, this makes it impossible to make judgment of the amount of deviation. Because of this, $b/2$ must be made larger than $|b|$.

with a configuration where the light projecting and receiving elements are arranged as shown in FIG. 11, when $V_b < V_c$, this means that a portion of the light incident on the PSD during a short distance is missing. On the other hand, when $V_b > V_c$, this means that a portion of the light incident on the PSD during a long distance is missing. Therefore, it is necessary to make corrections on the short and long distance sides. For this reason, calculation is made to find the amount of a spot light deviation in a similar manner to equations (15) and (16), using + and − signs as shown in steps S7 and S8. This calculation is assumed to include a limiter function of $|\Delta b| \leq b/2$.

At step S9, an amount of correction $\Delta 1/1$ is computed according to the amount of spot light deviation $\Delta b$. This corresponds to the second term on the right side of equation (13).

At step S10, the result of measuring the distance in the central portion of the screen is obtained from equation (13), using the light-emitting section $40_1$ of the IRED 38. The resulting distance is assumed to be la. Then, at step S11, in order to measure the distance on the right side of the screen using the light-emitting section $40_2$ of the IRED 38, the switches 80 and 82 are caused to form a closed circuit with contact b to select the output of the corresponding PSD $18_2$.

In this state, at step S12, the light-emitting section $40_2$ of the IRED 38 is caused to emit light, and the position x of the center of gravity of the incident signal light in the same manner as step S2. Then, at step S13, the reciprocal of the distance $l_b$ to the subject located at the distance-measuring point on the right side is calculated from equation (3).

At steps S14, S15, and S16, the same actions as measuring the distance on the right side of the screen are performed in measuring the distance on the left side of the screen. Specifically, at step S14, the preamplifier output corresponding to the light-emitting section $40_3$ of the left-side distance-measuring IRED 38 is selected. At step 15, like step S12, the light-emitting section $40_3$ of the IRED 38 is caused to emit light, and the position in which the signal light enters is obtained. At step S16, the reciprocal of the distance $l_c$ to the subject located on the left-side distance-measuring point is computed from equation (3).

At step S17, the distance to the most likely main subject is selected from the subject distances $l_a$, $l_b$, and $l_c$ at each distance-measuring point thus obtained. As an example, a method of selecting the shortest distance will be described. At step S18, the camera is focused on the l.

Figure 10B:
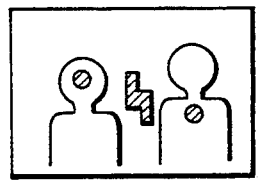

In this way, with the present embodiment where the light-receiving element for spot light deviation monitoring is also used as the PSD for measuring different points on the screen, a spot light deviation is minimized for the subject in the center of the screen without adding a reception lens and a light-receiving element. In addition, when the subject is not in the center of the screen as shown in FIG. 10B, a sharply focused picture can be taken.

Figure 13B:
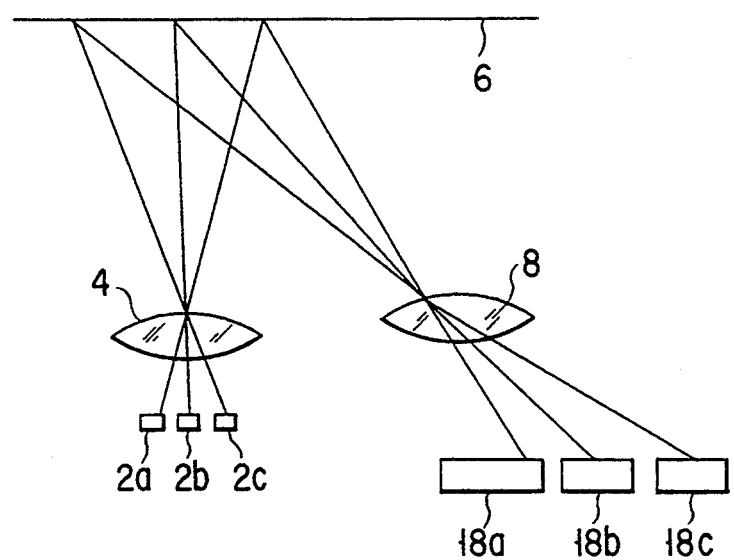

FIG. 13A shows a third embodiment of the present invention. This embodiment is an example of multi-AF preventing the camera from being out of focus when a spot light deviation takes place.

The third embodiment makes use of the construction of the first embodiment of FIG. 5. Specifically, the IRED is divided into three parts, $2a$, $2b$, and $2c$, which are arranged in the direction of base length so that the distance to the subject located in the center and on both sides of the screen may be measured through the projection lens 4. The PSD is also divided into three parts, $18a$, $18b$, and $18c$ so as to correspond to each part of the IRED.

By causing the IRED to emit light sequentially, the distance to each point can be measured in sequence with the AFIC 12 and CPU 16. Light-receiving elements $20_1$ and $20_2$ for spot light deviation monitoring are placed so as to sandwich the entire PSD.

Figure 14:
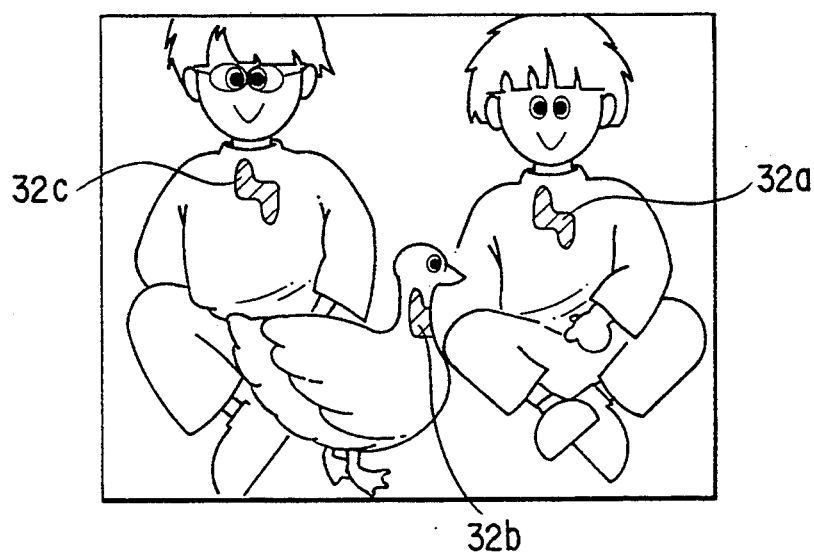
FIGS. 14 illustrates general composition of a photograph where the subjects are on the screen of the light projecting and receiving elements of FIGS. 13A and 13B.
Figure 15:
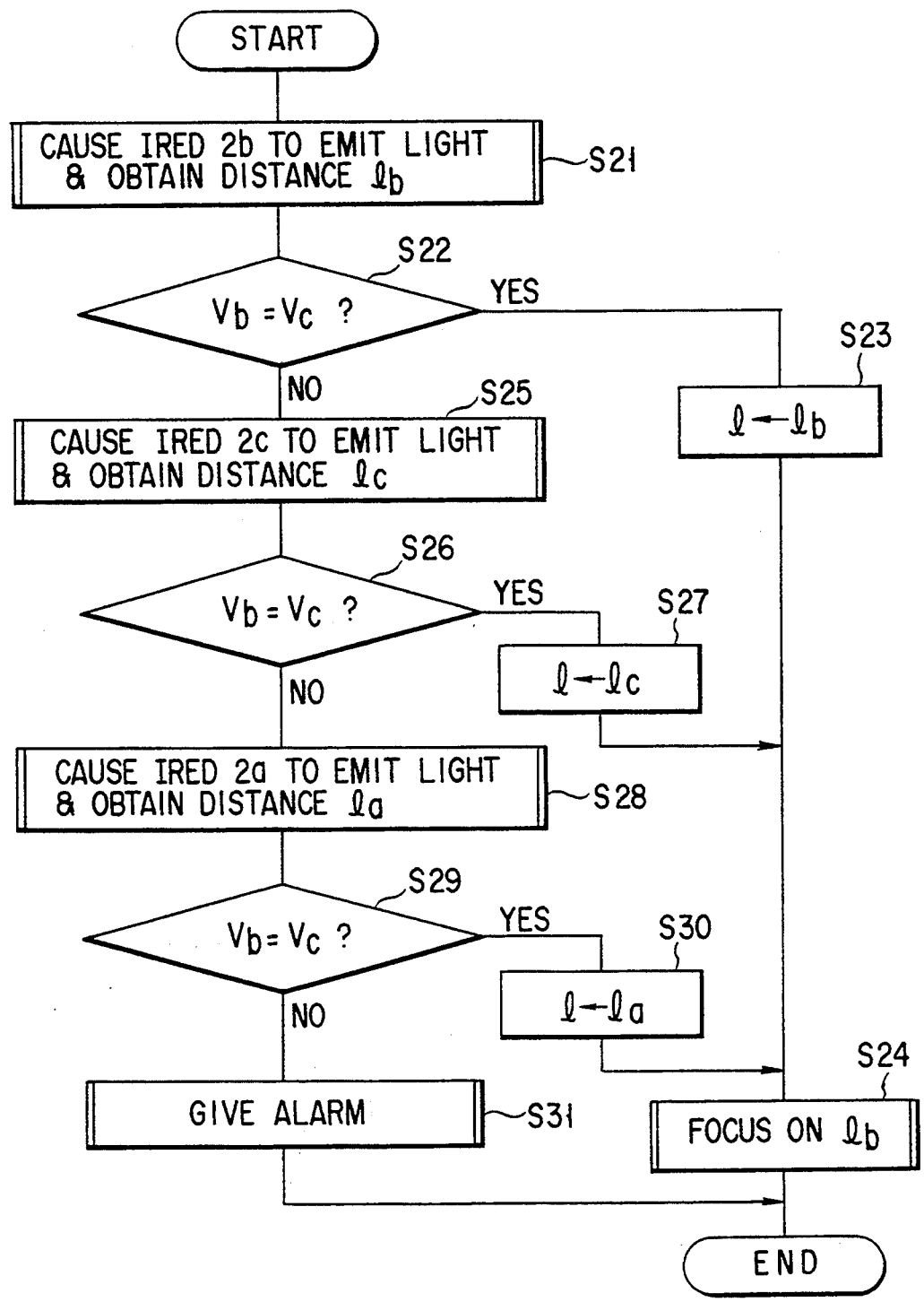
FIG. 15 is a flowchart for explaining the operation of the FIG. 13 distance-measuring device.

By constructing the IRED and PSD in this way, erroneous distance measurement can be prevented as long as the subjects exist at the right and left sides of the screen even if the central IRED part is subjected to a spot light deviation, as shown in FIG. 14. Referring to the FIG. 15 flowchart, explanation will be given about an example of preventing a blurred picture by introduction of multi-AF techniques that enable the distance of more than one point on the screen to be measured.

When distance measurement is started in response to the release action, at step S21, the central distance-measuring IRED $2b$ is caused to emit light to obtain the subject distance $l_b$. In this case, if the signals $V_b$ and $V_c$ based on the amount of light striking the monitoring light-receiving elements $20_1$ and $20_2$ are equal, this means that a spot light deviation has occurred. Therefore, if the result of the comparison at step S21 shows that $V_b = V_c$, control proceeds to step S23, where the value of $l_b$ is substituted into l. After this, control goes to step S24, where the camera is focused on $l_b$.

For the scene shown in FIG. 14, however, when a spot 32b hits the slender neck of a duck in the center of the screen, resulting in a spot light deviation, the distance $l_b$ indicates an erroneous value and $V_b > V_c$ holds. This permits control to move from step S21 to step S25. At this time, the CPU 16 judges from the output of the light-amount comparator circuit 28 that a spot light deviation has taken place. It then discards the unreliable $l_b$, and causes the left-side distance-measuring IRED part $2c$ to emit light for measurement of $l_c$.

Next, at step S26, spot light judgment is possible. Here, whether or not $V_b$ and $V_c$ are equal is judged to determine whether or not a spot light deviation has occurred. As a result, if $V_b = V_c$ holds, control goes to steps S27 and S24, where the camera is focused with the value of $l_c$.

In the example of FIG. 14, however, a spot 32c hits both of the duck's wing and the left-side person, which may cause erroneous measurement like a spot light deviation. In this case, therefore, control goes to step S28, where the right-side distance-measuring IRED part $2a$ is caused to emit light to measure the distance $l_a$.

Then, at step S26, judgment of spot light deviation is made. In the FIG. 14 example, a complete spot is on the right-side child. Consequently, at step S29, $V_b = V_c$ holds, which allows control to proceed to steps S30 and S24, where the camera is focused on $l_a$. Therefore, the camera is not focused correctly on the duck, but stays within an acceptable blurring range. This allows a picture well focused on the child to be taken.

If at step S29, it is judged that a spot light deviation has occurred, control goes to step S31, where the alarming section 30 audibly or visually alerts the photographer to a spot light deviation and tells him that the composition should be modified.

In this way, unlike what has been explained in FIGS. 9A and 9B, the present embodiment enables a spot light deviation to be detected at any of the three distance-measuring points.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A distance-measuring device comprising:
    light-projecting means for projecting light onto a subject, a projection pattern of said light-projecting means having a central area along a base length, and two protruding areas perpendicular and asymmetrical to said base length;
    light-receiving means for receiving the reflected portion of said projected light from said subject, which includes a first light-receiving section that receives the reflected light associated with the light projected from said central area and produces a first photoelectric conversion signal, a second light-receiving section that receives the reflected light associated with the light projected from one of said two protruding areas and produces a second photoelectric conversion signal, and a third light-receiving section that receives the reflected light associated with the light projected from the other of said two protruding areas and produces a third photoelectric conversion signal;
    computing means for calculating the distance to said subject based on said first photoelectric conversion signal; and
    comparator means for comparing said second and third photoelectric conversion signals and supplying the comparison result, from which it is judged that said light-projecting means has projected light uniformly onto said subject when the compared second and third photoelectric conversion signals are almost equal, while part of said projected light is missing when one of the compared second and third photoelectric conversion signals is larger than the other.

2. A distance-measuring device according to claim 1, further comprising correction means for, when said judgment result shows that part of said projected light is missing, correcting an output of said computing means as much as a value corresponding to nearly half the width of the protruding area of said projection pattern, depending on the inequality relationship between said second and third photoelectric conversion signals.

3. A distance-measuring device according to claim 1, further comprising correction means for, when said judgment result shows that part of said projected light is missing, obtaining a ratio of said second and third photoelectric conversion signals, and based on the obtained ratio, correcting an output of said computing means.

4. A distance-measuring device according to claim 1, further comprising indicator means for providing an alarming indication when said judgment result shows that part of said projected light is missing.

5. A distance-measuring device according to claim 1, wherein said first light-receiving section comprises a position-sensing device, and said computing means calculates said subject distance based on a pair of photoelectric conversion signals supplied from said position-sensing device.

6. A distance-measuring device according to claim 1, wherein said second and third light-receiving sections comprise respective silicon photodiodes, and said comparator means compares outputs of the respective silicon photodiodes.

7. A distance-measuring device of a camera, comprising:
    light-projecting means for projecting light onto a subject, a projection pattern of said light-projecting means having a symmetrical portion and an asymmetrical portion with respect to a base length;
    light-receiving means for receiving the reflected portion of said projected light from said subject, which includes a first light-receiving section that receives the reflected light associated with the light projected from said symmetrical portion and produces a first photoelectric conversion signal, and a second light-receiving section that receives the reflected light associated with the light projected from said asymmetrical portion and produces a second photoelectric conversion signal;
    computing means for calculating the distance to said subject based on said first photoelectric conversion signal; and
    judging means for judging, based on said second photoelectric conversion signal, whether or not all of the projection pattern from said light-projecting means is projected onto said subject.

8. A distance-measuring device of a camera according to claim 7, wherein:
    said asymmetrical portion of said projection pattern comprises of two protruding areas that flank the base length;
    said light-receiving means identifies said two protruding areas and produces the second photoelectric conversion signal; and
    said judging means makes a judgment based on said second photoelectric conversion signal obtained after said identification by said light-receiving means.

9. A distance-measuring device of a camera according to claim 7, wherein said computing means makes a correction in said subject distance when the judgment result of said Judging means shows that part of said projected light is missing.

10. A distance-measuring device of a camera according to claim 7, further comprising indicator means for providing an alarm indication when the judgment result of said Judging means shows that part of said projected light is missing.

11. A distance-measuring device of a camera, comprising:
    a plurality of light-projecting means for projecting light onto a subject, a first projection pattern projected in parallel with an optical axis of a taking lens in said light-projecting means having a central area along the base length and two protruding areas perpendicular and asymmetrical to said base length, a second projection pattern projected in one direction different from the direction of the optical axis of said taking lens, and a third projection pattern projected in another direction and symmetrical with the second projection pattern;

a plurality of light-receiving means for receiving the reflected portion of said projected light from said subject, which includes a first light-receiving section that receives the reflected light associated with the light projected from said central area of said first projection pattern and produces a first photoelectric conversion signal, a second light-receiving section that receives the reflected light associated with the light projected from one of said two protruding areas of said first projection pattern or of said second projection pattern and produces a second photoelectric conversion signal, and a third light-receiving section that receives the reflected light associated with the light projected from the other of said two protruding areas of said first projection pattern or of said third projection pattern and produces a third photoelectric conversion signal;

computing means for calculating the distance to said subject based on said first photoelectric conversion signal and said second or third photoelectric conversion signal during the projection of said second or third projection pattern; and comparator means for comparing said second and third photoelectric conversion signals during the projection of said first projection pattern and supplying a comparison result, from which it is judged that all of the first projection pattern from said light-projecting means has been projected onto said subject when the compared second and third photoelectric conversion signals are almost equal, while part of said projected light is missing when one of the compared second and third photoelectric conversion signals is larger than the other.

12. A distance-measuring device of a camera according to claim 11, wherein said plurality of light-projecting means projects said first, second, and third projection patterns in time sequence.

13. A distance-measuring device of a camera according to claim 11, further comprising correction means for, when said judgment result shows that part of said projected light is missing, obtaining a ratio of said second to third photoelectric conversion signals, and based on the obtained ratio, correcting an output of said computing means.

14. A distance-measuring device of a camera according to claim 11, wherein each of said first, second, and third light-receiving sections comprises a position-sensing device, and said computing means calculates said subject distance based on a pair of photoelectric conversion signals supplied from each of said position-sensing devices.

15. A distance-measuring device of a camera according to claim 14, wherein said comparator means compares a sum signal of a pair of photoelectric conversion signals supplied from said second light-receiving section with a sum signal of a pair of photoelectric conversion signals supplied from said third light-receiving section.

16. A distance-measuring device of a camera, comprising:

light-projecting means for projecting light onto a subject, which includes a first light-projecting section that projects a first projection pattern asymmetrical with a base length along an optical axis of a taking lens, and a second light-projecting section that projects a second projection pattern of a symmetrical shape in opposite directions flanking the optical axis of said taking lens;

a plurality of light-receiving means for receiving the reflected portion of said projected light from said subject, which includes a first light-receiving section that receives the reflected light associated with the portions other than the asymmetrical portions of said first projection pattern and produces a first photoelectric conversion signal, and a second light-receiving section that receives the reflected light associated with both the asymmetrical portions of said first projection pattern and said second projection pattern and produces a second photoelectric conversion signal;

computing means for calculating the distance to said subject based on said first photoelectric conversion signal during the projection of said first projection pattern and said second photoelectric conversion signal during the projection of said second projection pattern; and judging means for determining whether or not all of said first projection pattern from said light-projecting means is projected onto said subject on the basis of said second photoelectric conversion signal during the projection of said first projection pattern.

17. A distance-measuring device of a camera according to claim 16, wherein said light-projecting means projects said first and second projecting patterns in time sequence.

18. A distance-measuring device of a camera according to claim 16, wherein said second light-receiving section identifies the reflected light associated with the projected light of two different directions of said second projection pattern and supplies the identified signals; and wherein said distance-measuring device further comprises:

correction means for, when said judgment result shows that part of said projected light is missing, obtaining a ratio of the outputs identified at said second light-receiving section, and based on the obtained ratio, correcting an output of said computing means.

19. A distance-measuring device of a camera according to claim 16, wherein each of said first and second light-receiving sections comprises a position-sensing device, and said computing means calculates said subject distance for each projection axis based on a pair of photoelectric conversion signals supplied from each position-sensing device.

20. A distance-measuring device of a camera according to claim 19, wherein said comparator means compares a sum signal of a pair of photoelectric conversion signals supplied from said second light-receiving section with a sum signal of a pair of photoelectric conversion signals supplied from said third light-receiving section.

21. A distance-measuring device of a camera according to claim 19, wherein a shortest of the subject distances obtained for each projection axis is determined to be a focal length of the taking lens.

22. A distance-measuring device for measuring a distance to an object comprising:

light-projecting means for projecting light onto the object, a projection pattern of said light-projecting means having an asymmetrical portion with respect to a base length;

light-receiving means for receiving the reflected light from said object of said asymmetrical portion of said projected light, and producing a first photoelectric conversion signal; and judging means for determining whether or not all of the projection pattern from said light-projecting means is projected on said object on the basis of said first photoelectric conversion signal.

23. A distance-measuring device according to claim 22, wherein:

the projection pattern of said light-projecting means further has a symmetrical portion with respect to the base length;

said light-receiving means further receives said symmetrical portion and produces the second photoelectric conversion signal;

and said distance-measuring device further comprises computing means for obtaining the distance to said object based on said second photoelectric conversion signal.

24. A distance-measuring device according to claim 22, wherein:

said asymmetrical portion of said projection pattern comprises two protruding areas that flank the base length;

said light-receiving means identifies said two protruding areas and produces the first photoelectric conversion signal; and said judging means makes a judgment based on the first photoelectric conversion signal obtained after the identification by said light-receiving means.

25. An active distance-measuring device comprising:

light-projecting means for projecting a light beam onto an object;

light-receiving means located a predetermined base length away from said light-projecting means for receiving the reflected light from said object which has said light beam projected thereon;

computing means for obtaining a value corresponding to the distance to said object based on an output of said light-receiving means;

said light-projecting means producing a projection pattern which has two protruding areas that extend at both ends of said base length in opposite directions at right angles with said base length;

said light-receiving means comprising a main light-receiving element that receives the reflected light associated with the areas other than the protruding areas of said projection pattern and produces an optical current according to the light-receiving position, and two sub-light-receiving elements that receive the reflected light associated with the two protruding areas of said projection pattern and each of which produce an optical current corresponding to the amount of light received; and said computing means obtaining a value corresponding to the distance to said object based on an output of said main light-receiving element and judging from the output of said two sub-light-receiving elements whether or not a spot light deviation has occurred, and, when the judgment shows the presence of a spot light deviation, correcting the value corresponding to the distance to said object.

26. A distance-measuring device comprising:

projection and reception lenses spaced a predetermined distance apart;

light-projecting means for projecting distance-measuring light onto a subject through said projection lens, the distance-measuring light pattern from said light-projecting means having two protruding areas that extend at both ends along an optical axis of said projection and reception lenses in opposite directions at right angles with the optical axis;

light-receiving means for receiving the reflected light from said subject of said distance-measuring light, which comprises a first light-receiving element that receives the reflected light associated with the areas other than the protruding areas and produces an optical current according to position in which the light has been sensed, and a second light-receiving element, located in parallel on both sides of said first light-receiving element, that receives the reflected light associated with the two protruding areas and produces two optical currents corresponding to the amount of light received;

computing means for producing a signal corresponding to the distance to said subject based on the output of said first light-receiving element;

judging means for comparing the two optical current outputs of said second light-receiving element to determine whether or not a spot light deviation has occurred; and correction means for, when said judging means has determined that a spot light deviation has occurred, obtaining an amount and direction of the spot light deviation from the two outputs of said second light-receiving element and correcting an output of said computing means.

27. An active distance-measuring device comprising:

light-projecting means for projecting a light beam onto an object;

light-receiving means located a predetermined base length away from said light-projecting means for receiving the reflected light from said object of said light beam;

computing means for obtaining a value corresponding to the distance to said object based on an output of said light-receiving means;

said light-projecting means including a light-projecting element for projecting an asymmetrical light beam with respect to said base length;

said light-receiving means further including a light-position sensing element that produces an optical current corresponding to the position in which said reflected light has been received, and two photoelectric conversion elements, located in parallel on both sides of said light position sensing element, each of said two photoelectric conversion elements producing an optical current corresponding to the amount of said reflected light received; and said computing means including judging means for determining whether or not a spot light deviation has occurred on the basis of the outputs of said two photoelectric conversion elements.

28. An active distance-measuring device according to claim 27, wherein said computing means further includes means that for correcting the value corresponding to the distance to said object on the basis of the outputs of said two photoelectric conversion elements when said judging means has determined that a spot light deviation has occurred.

29. An active distance-measuring device according to claim 27, wherein said computing means further includes means for, when said judging means has deter- 30. A distance-measuring device comprising:
light-projecting means for projecting distance-measuring light on a plurality of points covering a central portion of a focusing screen, said light-projecting means including a plurality of light-projecting elements arranged along a base length, a distance-measuring light pattern projected from said plurality of light-projecting elements being asymmetrical with an optical axis of projection and reception lens pairs of each of said plurality of light-projecting elements;
light-receiving means located a predetermined distance away from said light-projecting means along said base length to receive a plurality of said distance-measuring light beams, said light-receiving means comprising three light-receiving elements arranged in parallel along said base length, a central one of the three light-receiving elements producing an optical current corresponding to the position in which light has been received, and the other two of the three light receiving elements producing two optical currents corresponding to the amount of light received;
computing means for producing a signal corresponding to the distance to the subject on the basis of an output of said central light-receiving element;
sensor means for comparing outputs of said two other light-receiving elements to sense an occurrence of a spot light deviation; and
control means for normally causing the central of said three light-receiving elements to emit light to measure the distance for the central portion of the focusing screen, and when said judging means has detected the occurrence of a spot light deviation, then causing another of said three light-receiving elements to emit light to measure the distance for another part of the focusing screen.

31. An active distance-measuring device comprising:
light-projecting means for projecting distance-measuring light onto a subject, a projection pattern of said light-projecting means being asymmetrical with reference to a base length;
light-receiving means located a predetermined distance away from said light-projecting means along said base length for receiving the reflected light from said subject of said distance-measuring light, said light-receiving means comprising a main light-receiving element that produces an optical current corresponding to the position in which the light has been received, and two sub-light-receiving elements located on both sides of the main light-receiving element for producing respective optical currents corresponding to the amount of light received; and
computing means for producing a signal corresponding to the distance to said subject based on outputs of said main light-receiving element and of said two sub-light-receiving elements.

32. A multi-point distance-measuring device comprising:
light-projecting means including three light-projecting elements for respectively projecting three distance-measuring light beams onto three points covering a central portion of a focusing screen;
three light-position sensing elements located a predetermined distance away from said light-projecting means along a base length from said light-projecting means and arranged in parallel along said base length to receive the reflected light from the subject of each of said three distance-measuring light beams;
computing means for producing three subject distance signals on the basis of outputs of said three light-position sensing elements;
the distance-measuring light beam pattern projected from a central one of said three light-projecting elements is asymmetrical with respect to said base length;
said three light-position sensing elements including two side light-position sensing elements which receive asymmetrical portions of the light beam of a central light-projecting element; and
said computing means including means for, when said side light-position sensing elements on both sides have sensed the asymmetrical portions of the light beam of said central light-projecting element, detecting an amount of light received for each element and judging whether or not a spot light deviation has occurred.

33. A distance-measuring device for projecting distance-measuring light onto a plurality of points on an image screen to measure a distance to each point, comprising:
judging means for judging whether or not all of a projection pattern of said distance-measuring light projected at least onto a central portion of the image screen is on the subject;
means for discarding a distance measurement result of said light-projecting pattern when said judgment result shows that all of the projection pattern is not on the subject.

34. A distance-measuring device according to claim 33, wherein said distance-measuring device measures the distance to another point when it is judged that all of said projection pattern is not on the subject.

35. An active distance-measuring device comprising:
light-projecting means for projecting a distance-measuring light beam onto an object;
light-receiving means for receiving light reflected by the object and outputting a signal representing a location where the reflected light is received;
detecting means for detecting whether a spot light deviation has occurred in the distance-measuring light beam projected from said light-projecting means and a direction of the spot light deviation; and
computing means for computing a distance to the object in response to the signal output from said light-receiving means and based on a detection result obtained from said detecting means.

36. An active distance-measuring device for projecting a distance-measuring light beam onto an object and computing a distance to the object in accordance with a location where light reflected by the object is received, comprising:
light-amount detecting means for detecting an amount of the reflected light received from the object; and
determining means for determining whether the distance-measuring light beam is emitted onto an entire surface of the object based on the amount of the reflected light detected by said light-amount detecting means.

37. A device according to claim 36, further comprising adjusting means for adjusting the distance to the object based on the amount of the reflected light and a result obtained from said determining means.

38. A device according to claim 36, further comprising display means for displaying an alarm when said determining means determines that the distance-measuring light beam is not emitted onto the entire surface of the object.

39. A device according to claim 36, further comprising:
computing means for computing an amount of a spot light deviation which is part of the distance-measuring light beam and is not emitted to the object; and
detecting means for detecting a direction of the spot light deviation.

40. A device according to claim 39, further comprising correcting means for correcting the distance to the object in accordance with the amount of the spot light deviation when it is determined by said computing means that the amount of the spot light deviation is smaller than a predetermined value.

41. A device according to claim 39, further comprising correcting means for, when it is determined by said computing means that the amount of the spot light deviation is larger than a predetermined value, correcting the distance to the object using the predetermined value.

42. A device according to claim 39, further comprising correcting means for detecting a direction of the spot light deviation and correcting the distance to the object using a predetermined value.

43. A device according to claim 42, wherein said predetermined value depends upon a size of a spot of the distance-measuring light beam projected onto the object.

44. A device according to claim 42, wherein said correcting means includes means for adding or subtracting a predetermined value to or from the distance computed by said distance-measuring device in accordance with the direction of the spot light deviation.

45. A distance-measuring device comprising:
light-projecting means for projecting a plurality of distance-measuring light beams onto an object;
light-receiving means for receiving light reflected by the object and detecting a location where the reflected light is received and an amount of the reflected light received;
judging means for judging whether the distance-measuring light beams are correctly projected onto the object in accordance with an output of said light-receiving means; and
selecting means for selecting a focal distance of a camera from a plurality of distances obtained from said plurality of distance-measuring light beams in accordance with an output of said judging means.

46. A distance-measuring device comprising:
light-projecting means for projecting a plurality of distance-measuring light beams onto an object;
light-receiving means for receiving light reflected by the object and detecting a location where the reflected light is received and an amount of the reflected light received;
judging means for judging whether the distance-measuring light beams are correctly projected onto the object in accordance with an output of said light-receiving means; and
determining means for determining whether distances to different points are measured in accordance with an output of said judging means.

47. A distance-measuring device comprising:
light-projecting means for projecting a plurality of distance-measuring light beams onto an object;
light-receiving means for receiving light reflected by the object and detecting a location where the reflected light is received and an amount of the reflected light received;
judging means for judging whether the distance-measuring light beams are correctly projected onto the object in accordance with an output of said light-receiving means; and
detecting means for detecting a presence or an absence of a spot light deviation of a pattern of one of said plurality of distance-measuring light beams which is projected to a central point of the object and a direction of the spot light deviation, by outputs of light-receiving elements for measuring distances to points other than the central point of the object.

48. A distance-measuring device comprising:
light-projecting means for projecting a distance-measuring light beam onto an object;
first light-receiving means for receiving light reflected by the object and determining a distance to the object from a location where the reflected light is received; and
second light-receiving means for receiving light reflected by the object and determining whether the distance-measuring light beam is correctly projected onto the object in accordance with the reflected light received by said second light-receiving means.

49. A device according to claim 48, wherein said second light-receiving means is located perpendicularly to a line connecting said light-projecting means and said first light-receiving means.

50. A distance-measuring device comprising:
a light-projecting lens and a light-receiving lens which are arranged in a direction horizontal to said distance-measuring device;
a plurality of light-projecting means for projecting a plurality of distance-measuring light beams onto at least one subject through the light-projecting lens; and
a plurality of light-receiving means which include a plurality of light-receiving elements for receiving the distance-measuring light beams reflected by said at least one subject through the light-receiving lens so as to detect locations where the reflected distance-measuring light beams are received,
said light-receiving elements including:
a first light-receiving element for distance-measuring a subject located in a space extending from a center of a projection screen; and
second light-receiving elements, longer than said first light-receiving element, for distance-measuring at least one subject located in a space corresponding to a region surrounding the center of the projection screen;
said light-receiving elements being arranged in a staggered manner such that said second light-receiving elements are provided above and below said first light-receiving element in the vicinity of said first light-receiving element and in parallel to longer sides of said first light-receiving element;

and wherein said second light-receiving elements which are above and below said first light-receiving element are offset from each other in a length direction thereof; and said light-projecting means sequentially emitting the distance-measuring light beams, thereby enabling distances to be measured at a plurality of distance-measuring points.

51. The device according to claim 50, wherein, when an intermediate light-projecting means of said plurality of light-projecting means is driven, outputs of the light-projecting means adjacent to said intermediate light-projecting means are used to detect whether a light beam from the intermediate light-projecting means is emitted correctly to said at least one subject.

* * * * *

UNITED STATES PATENT AND TRADEMARK OFFICE
CERTIFICATE OF CORRECTION

PATENT NO. : 5,361,117
DATED : November 1, 1994
INVENTOR(S) : NONAKA

It is certified that error appears in the above-indentified patent and that said Letters Patent is hereby corrected as shown below:

Title Page, Item [54] Title:

delete "WHICH DETECTS" (second occurrence)

Signed and Sealed this

Fifth Day of December, 1995

Attest:

BRUCE LEHMAN

*Attesting Officer*  *Commissioner of Patents and Trademarks*